Patented Sept. 25, 1934

1,974,436

UNITED STATES PATENT OFFICE 1,974,436

FLUX FOR USE IN SOLDERING

William K. Schweitzer, East Cleveland, Ohio, assignor to The Grasselli Chemical Company, Cleveland, Ohio, a corporation of Delaware No Drawing. Application December 16, 1933, Serial No. 702,795

14 Claims. (Cl. 148—23)

The present invention relates to zinc chloride base fluxes containing small amounts of sulfation products of aliphatic alcohols containing more than seven carbon atoms in the aliphatic radical.

The sulfation products referred to herein are obtained by reacting concentrated sulfuric acid, oleum, chlorosulfonic acid, or other sulfuric acid derivatives of strongly sulfonating properties, upon aliphatic alcohols or esters containing more than seven carbon atoms in the alcoholic radical. According to the best experimental evidence available, the sulfation products of the alcohols are sulfuric acid esters of the probable formula R—O—SO$_3$H with the possible inclusion of minor amounts of sulfonic acids. When sulfating esters of unsaturated alcohols, the sulfuric acid adds itself to the double bond, but the evidence available is insufficient to decide if the products are sulfuric acid esters, sulfonic acids, or a mixture of such compounds. As far as applicability in my invention is concerned the reaction products obtained by the action of the sulfuric acid, etc. upon the alcohols or upon the unsaturated esters are entirely equivalent, and for the purposes of my invention I choose to call these products the sulfates of aliphatic compounds having an alcoholic radical of more than seven carbon atoms, the presence of an aliphatic alcoholic hydrocarbon radical of more than seven carbon atoms and a salt forming sulfur-oxygen group in the molecule being the determinants for the availability of a given compound for addition to zinc chloride soldering fluxes.

The higher alcohols from which the sulfates useful in my invention are derived are, for instance, oleyl, stearyl, cetyl, lauryl, mesitoyl, carnaubyl, melissyl, etc. alcohols, their mixtures and esters or ethers, such as acetyl-octyl-alcohol, stearo-glyceryl ether, oleo-glyceryl ether, palmetto glyceryl ether, etc. Similarly other higher alcohols which can be obtained by hydrogenation of fatty acids, and their esters, or by high pressure hydrogenation of carbon monoxide are, when sulfated, very useful addition agents for zinc chloride fluxes according to my invention. Particularly useful, however, are the sulfates obtained from primary alcohols and their oxygen derivatives in which the alcoholic hydrocarbon radical contains from eight to eighteen, inclusive, carbon atoms.

These sulfates form soluble alkali metal, ammonia and amine salts, etc., and it is in the form of such salts that they are most conveniently added to the zinc chloride fluxes.

In using my invention in practice I may, for example, add cetyl sulfuric ester in amount equal to from about $\frac{1}{16}$% to about 2% by weight of zinc chloride, calculated as a concentrated zinc chloride solution, to a zinc chloride base flux. Specifically I have found that the addition of cetyl sulfuric ester in an amount equal to $\frac{1}{8}$% by weight of a 30° Bé. zinc chloride solution to such zinc chloride solution constitutes a very satisfactory flux.

As another example of the practice of my invention I may mention the addition of oleyl sodium sulfate to a zinc chloride base flux in an amount about equal to $\frac{1}{16}$ to 2% by weight of the zinc chloride calculated as a concentrated solution. Specifically I may add $\frac{1}{8}$% or $\frac{1}{2}$% of the oleyl sodium sulfate to a 30° Bé. zinc chloride solution to produce a highly satisfactory flux.

The sulfates of my invention may be directly dissolved in the fluxes or they may first be dissolved in a suitable solvent, such as water, alcohol, etc., then added to the fluxes.

Another example of the practice of my invention, using alcohol as a solvent, a flux of the following composition was made:

| | Percent by weight |
|---|---|
| Zinc chloride | 25 |
| Alcohol, denatured | 20 |
| Cetyl ammonium sulfate | 0.25 |
| Water | Balance |

The fluxes of my invention may be applied to the metal to be soldered in any desired way and the soldering operation may then proceed in any conventional manner.

I claim:

1. A flux for soft soldering metals comprising zinc chloride and a sulfate of an aliphatic compound containing an alcoholic hydrocarbon radical of more than seven carbon atoms.

2. A flux for soft soldering comprising zinc chloride and a small amount of a sulfate of a primary alcohol of from eight to eighteen, inclusive, carbon atoms.

3. A flux for soft soldering metals comprising zinc chloride, alcohol, and a salt of a sulfate of an aliphatic compound containing an alcoholic hydrocarbon radical of more than seven carbon atoms.

4. A flux for soft soldering metals comprising zinc chloride, alcohol and a salt of a sulfate of a primary alcohol of from eight to eighteen, inclusive, carbon atoms.

5. A flux for soft soldering metals comprising zinc chloride and cetyl sulfuric ester.

6. A flux for soft soldering metals comprising zinc chloride and oleyl sodium sulfate.

7. A flux for soft soldering metals comprising zinc chloride, alcohol, and cetyl ammonium sulfate.

8. In a process of soft soldering, the step of applying a flux comprising zinc chloride and a sulfate of an aliphatic compound containing an alcoholic hydrocarbon radical of more than seven carbon atoms.

9. In a process of soft soldering, the step of applying a flux comprising zinc chloride and a small amount of a sulfate of a primary alcohol of from eight to eighteen, inclusive, carbon atoms.

10. In a process of soft soldering the step of applying a flux comprising zinc chloride, alcohol, and a salt of a sulfate of an aliphatic compound containing an alcoholic hydrocarbon radical of more than seven carbon atoms.

11. In a process of soft soldering the step of applying a flux comprising zinc chloride, alcohol, and a salt of a sulfate of a primary alcohol of from eight to eighteen, inclusive, carbon atoms.

12. In a process of soft soldering, the step of applying a flux comprising zinc chloride and cetyl sulfuric ester.

13. In a process of soft soldering, the step of applying a flux comprising zinc chloride and oleyl sodium sulfate.

14. In a process of soft soldering the step of applying a flux comprising zinc chloride, alcohol, and cetyl ammonium sulfate.

WILLIAM K. SCHWEITZER.